March 10, 1970  H. T. STIRLING  3,499,428
SMOG RETARDER APPARATUS
Filed Feb. 20, 1968
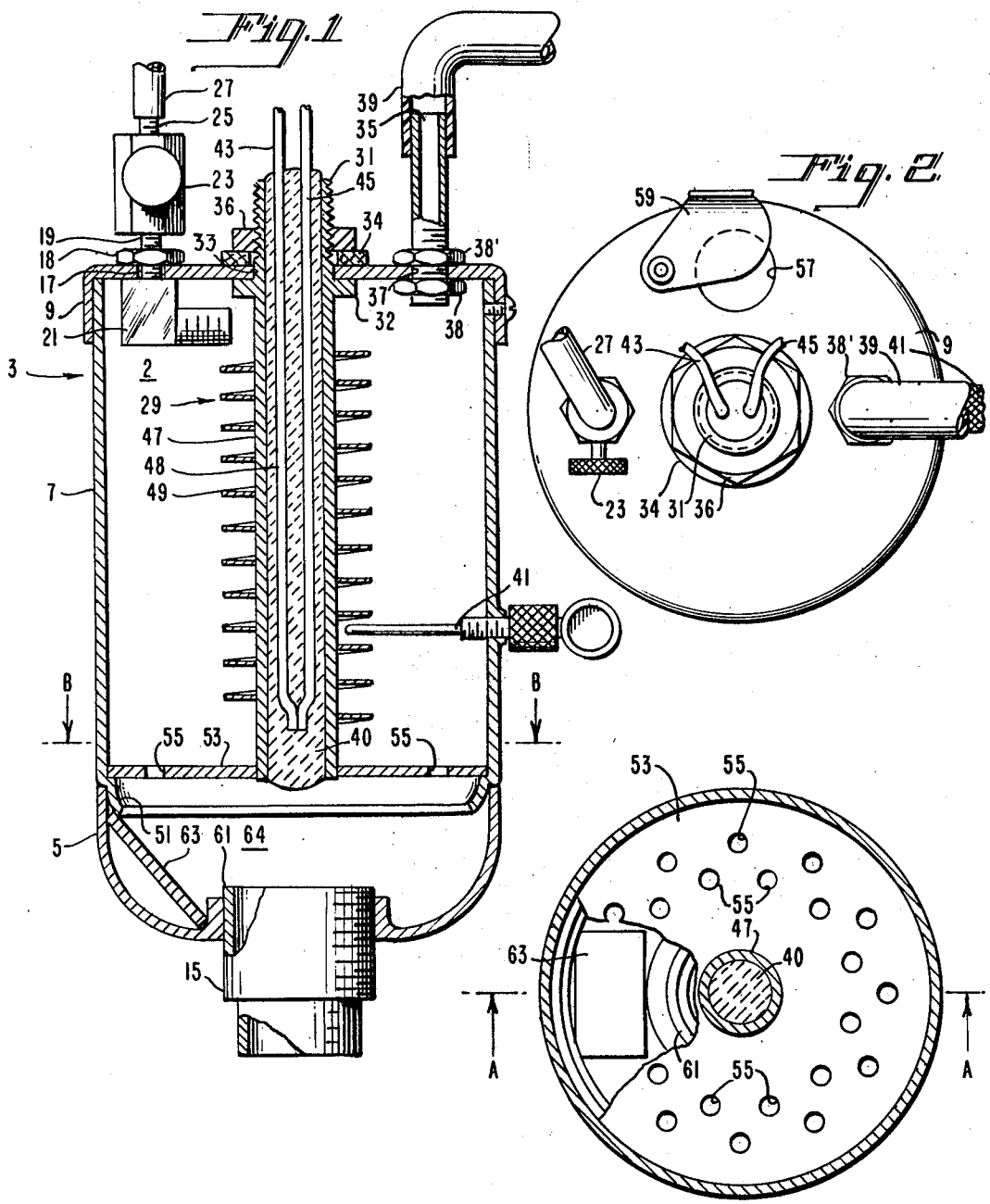
HAROLD T. STIRLING
INVENTOR.
BY Ronald S. Cornell
ATTORNEY

United States Patent Office 3,499,428
Patented Mar. 10, 1970

3,499,428
SMOG RETARDER APPARATUS
Harold Tamplin Stirling, 249 Roycroft Ave.,
Pittsburgh, Pa. 15234
Filed Feb. 20, 1968, Ser. No. 706,922
Int. Cl. F01m *1/10;* F16n *17/06;* C10g *17/00*
U.S. Cl. 123—196      9 Claims

ABSTRACT OF THE DISCLOSURE

Smog retarder apparatus designed for use with an internal combustion engine which includes a chamber under vacuum having disposed therein an electrically heated vaporizing unit to volatilize water, gasoline hydrocarbons, etc. and a chemically reactive, e.g., magnesium, perforated plate over which a film of oil is passed to remove liquid sulfuric acid by chemical reaction, thereby removing potential air contaminants from the lubricating oil and reducing air contaminants in the exhaust gases due to more efficient combustion. Preferred embodiments include a catch basin for removing particulate solids, a magnet for removing magnetic particles and chemical reaction means for removing sulfuric acid vapors.

DETAILED DESCRIPTION

This invention relates to a smog retarder apparatus that is designed for use with an internal combustion engine so that the smog-contributing impurities in the lubricating oil may be reduced or removed before being exhausted into the atmosphere. The resultant purification of the lubricating oil leads also to more efficient operation of the internal combustion engine and a reduction in the noxious gases and particulate matter passing into the atmoshere via the engine exhaust.

One of the major problems faced by the more highly industrialized countries of the world today is control of air pollution, i.e., smog. Smog is the sum total of all contaminants, i.e., gases and suspended solid and liquid particulate matter, and is characterized by reduced visibility and physiological responses in humans, e.g., eye, ear, nose and throat irritation. Smog adversely affects vegetation, contributes to corrosion and is thought to be connected with the increased rate of lung cancer.

While all combustion of fuel associated with power generation and transportation is a significant source of air pollutants, the operation of the internal combustion engine on autos and trucks is a primary source of smoke, hydrocarbons, sulfuric acid and other compounds found in the air. In fact, in Mexico City and Los Angeles the internal combustion engine is the primary source. For example, the ordinary combustion of gasoline or diesel fuel in the internal combustion engine is a source of smoke, fumes, carbon monoxide, sulfur dioxide and hydrocarbons which pass into the atmosphere in the stream of exhaust gas. In the course of normal operation of the engine, the lubricating oil becomes contaminated with water, gasoline hydrocarbons and sulfuric acid. Due to these impurities in the oil, additional pollutants are introduced into the atmosphere in the stream of air used to ventilate the crank case and the efficiency of the oil as a lubricant is reduced.

The reduced lubricating efficiency in turn causes a reduction in the efficiency of the engine which is manifested by incomplete combustion and a further increase in air pollutants from the exhaust and ventilating air from the crank case. Thus, the condensation of water and gasoline hydrocarbons on cold cylinder walls results in the formation of emulsions of these condensates with the oil. These emulsions exhibit reduced lubricating efficiency and entrain additional particulate material, thereby reducing the efficiency of the internal combustion engine. Further, the water reacts with the hydrocarbons and sulfur or oxidized sulfur impurities in the oil and gas to form organic acids, organic aldehydes and sulfuric acid. The acids in turn cause corrosion of the cylinders, rings, etc. and further reduce the engine efficiency. Each reduction in engine efficiency results in a further increase of pollutants introduced into the atmosphere because of the further reduction in combustion efficiency.

While various oil refiners for attachment to engines have been devised to purify lubricating oils, these devices have not been effective in reducing air pollution for a variety of reasons. Some known devices vaporize hydrocarbons and water from the oil and exhaust these vapors directly into the atmosphere without further treatment. The vaporizing devices heretofore employed include exhaust gases and electrical heaters, but the effectiveness of these vaporizers is reduced because the design of the device provides for uneven flow of oil over the vaporizer surface. Further, the oil refiners have heretofore been ineffective in removing sulfuric acid from the oil and vaporizer gases because either sulfuric acid removal was not provided for or the shape and design of the removal device resulted in incomplete removal. Thus, previous oil refiners have permitted sulfuric acid to remain in the oil where it adversely affects engine efficiency and from which a portion passes into the atmosphere in the crank case ventilation air to form the characteristic blue haze.

The smog retarder apparatus described herein is adapted to overcome the shortcomings of the prior art devices discussed above. More particularly, the smog retarder apparatus effectively removes sulfuric acid from a film of devolatilized oil by chemical reaction. In a preferred embodiment, sulfuric acid vapors are also removed from the vaporizer gas stream by chemical reaction. The design and shape of the smog retarder apparatus facilitate vaporization of water and hydrocarbons from the oil by flowing a controlled stream of oil from the crank case in a thin film over a substantially evenly-heated long path heating element. Hydrocarbon and water vapors are returned to the engine intake manifold from which they pass to the combustion chamber where the hydrocarbons are oxidized. The presence of the water vapor during combustion reduces the amount of smoke in the exhaust gases. Thus, the smog retarder apparatus is effective to directly reduce the amount of hydrocarbons and sulfuric acid exhausted to the atmosphere from the oil lubrication system and to indirectly reduce the smoke and other contaminants in the exhaust by virtue of improved engine efficiency.

Although it is preferred to operate the smog retarder apparatus in combination with an oil filter, the smog retarder apparatus is designed to operate using oil taken directly from the crank case. For example, the oil outlet from the apparatus is designed to provide a sludge trap where solid particulate matter entrained in the oil can settle out. Also, a magnet is provided in the sludge trap to effectively remove any entrained magnetic solids, e.g., iron particles. Therefore, no oil filter is shown in combination with the smog retarder apparatus illustrated in the accompanying drawings.

Despite the absence of an oil filter in the attached drawings, it is preferred to pass the crank case oil through an oil filter prior to introducing it into the smog retarder apparatus. The oil filter removes solid particles or sludge, e.g., metal particles from bearing and cylinder walls and carbon particles formed during combustion, from the lubricating oil. This removal of solids from the lubricating oil feed to the smog retarder apparatus permits better flow control to the apparatus and avoids precipitation from the oil film in the vaporizing unit with a consequent fouling of the heat transfer surface. The use of the apparatus of the invention also extends the life of both the oil filter and the oil itself while adding many miles to the efficient life of the engine.

The invention is illustrated in a preferred embodiment in the accompanying drawings in which:

FIG. 1 is a vertical elevational view taken in section on lines A—A of FIG. 3;

FIG. 2 is a top plan view of the unit illustrated in FIG. 1; and

FIG. 3 is a horizontal cross section taken on line B—B of FIG. 1.

Referring to FIGS. 1–3, a chamber 1 is formed in a casing 3 having a bottom wall 5 and a cylindrical side wall 7, the open upper end of the casing being closed by a cap 9 which has formed thereon an annular flange 11. The flange 11 may be provided with one or more openings therein for registration with corresponding openings in the top of the casing 3 for receiving a suitable fastener such as screw 13 for removably securing the cap 9 to the casing 3.

The cap 9 is provided with a port 17 and a threaded oil inlet fitting 19 is affixed thereto by locknut 18 for introducing oil into the chamber through a nipple 21 on the lower end of fitting 19. It is a feature of this apparatus that externally of the casing 3 a flow control means such as a valve 23 is connected to oil inlet fitting 19 to permit adjustment of the temperature of treatment of the oil by changing the rate of flow of the oil therethrough. A flexible conduit 27, through which the oil is supplied, is connected to valve 23 by any suitable means such as threaded nipple 25 and may be connected to the oil pump or any other suitable point from which the oil can be pumped. An axially disposed oil discharge conduit 15 extends through the bottom wall 5 and provides an outlet through which purified oil is returned to the oil lubrication circuit, such as through the valve cover of the engine.

Centrally disposed in chamber 1 adjacent the tip of oil inlet 21 is an electrically heated vaporizing unit 29 for vaporizing volatilizable materials such as liquid organic materials and moisture from the oil. In accordance with the present arrangement, the vaporizing unit is suitably connected to holding means such as nipple 31 connected to and extends through opening 33 in the center of cap 9. The opening 33 is sealed on the underside of cap 9 by flange 32 and on the exterior thereof by suitable gasket means 34 and a locknut 36. The liquid and moisture which are vaporized escape from the chamber 1 through a vent means 35 inserted through opening 37 in the cap 9. Opening 37 is sealed on both sides of cap 9 by locknuts 38, 38'. Vent means 35 may desirably be connected to the intake manifold of an internal combustion engine by a flexible conduit 39. In a particularly preferred embodiment the vent means 35 is provided with a short length of foraminous magnesium metal, e.g., as a spiral or wire batt (not shown) to facilitate removal of sulfuric acid from the vapors by chemical reaction.

An important feature of the present smog retarder apparatus is the use of an electrically heated vaporizing means which is grounded at one end 43 (e.g. to casing 3) and is connected at its opposite end 45 to a source of electric potential such the battery, generator or alternator of the internal combustion engine. The energy source will preferably be the generator or alternator so that the device will operate only when the engine is running without the necessity of a special disconnect circuit. To avoid short circuits or hazardous shocks, the resistance wire 48 is insulated from heater element 47 and nipple 31 by filling the entire center portion thereof with a suitable insulating material 40 which is resistant both to hot oil and to the described contaminants. Affixed to heat conductive core element 47 is a helical fin 49. Both core 47 and fin 49 are made of a heat conductive metal such as copper and are suitably affixed to one another as by brazing. The heating element is preferably a resistance wire 48 which may be Nichrome or other suitable material.

The inlet oil conduit 21 is arranged to direct oil onto the top of fin 49 of vaporizing unit 29 and the rate of flow of the oil is controlled by valve 23 to achieve a flowing film of oil having the desired temperature. An advantage of the helical design which provides an inclined vaporizing surface in a small and compact smog retarder is that heat transfer is facilitated by the large surface area thereby provided in combination with the long path of travel and the resulting high retention time so that efficient vaporization and vapor removal takes place with a minimum of liquid entrainment. Vaporization is also facilitated because the chamber 1 is under vacuum due to the connection of vent means 37 to the intake manifold wherein a vacuum in the range of 12 to 25 inches of mercury is maintained.

The flow of the oil over the vaporizing surface is regulated by valve 23 so that the oil is heated above the boiling point of water under the vacuum conditions maintained in chamber 1 and the temperature may vary from about 170° F. to about 400° F., and preferably between about 220° and 320° F. These temperatures cause all of the water and hydrocarbons to evaporate from the oil and also result in the vaporization of sulfuric acid in accordance with Raoult's Law. To assist in adjusting the treatment temperature, oil flow temperature indicating means such as a thermometer 41 are provided. The thermometer may be placed in contact with the oil film flowing on the vaporizing means or in the catch basin 64.

The electrical heating element 47 has a resistance of between about one and 2.5 ohms and preferably about 2 ohms which enables the device to heat between 1.5 to 2.5 ounces of oil per minute to a temperature of 250–300° F. without drawing excessive current.

Resting on an annular flange 51 is a circular plate 53 of magnesium, aluminum, beryllium, or zinc provided near its periphery with a plurality of openings 55. An opening in the center of the plate is slidably, detachably connected to the lower portion of heater element core 47. Devolatilized oil from the electrically heated vaporizing unit flows by gravity onto plate 53 where it spreads out as a uniform thin film. Optionally, a plurality of bosses may be provided on the upper surface of the plate to facilitate film formation. During the flow over the plate the sulfuric acid in the oil reacts with the meal in the plate and thereby becomes neutralized before passing through openings 55. Neutralization of the sulfuric acid from a thin film of oil is necessary to substantially completely remove the acid since the flow of lubricating oil is maintained in the viscous flow region rather than the turbulent flow region. Periodic inspection is desirable and port 57 having slidable cover 59 (FIG. 2) facilitates such inspection without the necessity of dismantling the apparatus.

The purified oil is discharged from plate 53 to a catch basin or sludge trap 64 which is formed by extending the inner end 61 of discharge conduit 15 into the chamber 1 for a substantial distance above the bottom wall thereby defining an annular catch basin or sludge trap between the conduit and the inner side wall of the casing. The oil is retained in the annular area for a sufficient period to permit solid particles to settle therefrom. A magnet 63 is disposed therein to facilitate the retention of metallic particles. The catch basin also serves to provide a cooling bath wherein the temperature of the purified oil is reduced before it is returned to the engine.

The smog retarder apparatus of this invention is highly effective for removing hydrocarbons, carbon monoxide, carbon dioxide, sulfur dioxide, gasoline, sulfuric acid, water and other impurities from lubricating oil before they can be discharged into the atmosphere. It will also be noted that air pollution from the internal combusition engine exhaust is reduced indirectly because the continuous use of purified oil results in enhanced engine efficiency due to more efficient combustion. The apparatus may be mounted in an upright position at any location in the engine compartment and suitable mounting atachments may gine compartment and suitable mounting attachments may be provided for that purpose.

I claim:

1. A smog retarder apparatus for use in combination with an internal combustion engine comprising: a vertical chamber provided with oil inlet means and oil discharge means; means in said oil inlet means to limit the rate of oil flow therethrough, an electrically heated vaporizing unit having an inclined vaporizing surface adapted to receive oil directly from said oil inlet means; and an acid reactive metallic perforated plate disposed in said chamber below said vaporizing unit, said means to limit the rate of flow through said oil inlet means being effective to maintain a film-type flow of oil on said vaporizing unit and said plate; and vent means in the chamber adapted to discharge vapor therefrom to the intake manifold of said internal combustion engine, whereby smog is reduced by removal of volatile impurities and sulfuric acid from the oil before they can be introduced into the atmosphere and by improved combustion efficiency from use of purified lubricating oil.

2. A smog retarder apparatus in accordance with claim 1 wherein a catch basin is provided for removal of particulate solids.

3. A smog retarder apparatus in accordance with claim 1 wherein a permanent magnet is provided in said catch basin to facilitate removal of magnetic particulate solids.

4. A smog retarder apparatus for use in combination with an internal combustion engine comprising: a casing having an open top and a closed bottom; a cap closing the open top, said cap and said casing defining a chamber; oil inlet means in said cap; flow control means in said inlet means; a vaporizing unit centrally mounted in said chamber, said oil inlet means being arranged to flow oil directly onto an upper portion of said vaporizing unit, said unit having an inclined vaporizing surface in the form of a helix over which the oil flows as a thin film; electric means for heating the oil to vaporize impurities therefrom as the oil flows over said vaporizing surface; said flow control means being adapted to adjust the temperature of treatment of the oil by changing the rate of flow of the film of oil over the said vaporizing unit; flexible conduit means connecting said inlet to an oil source; vent means in the cap adapted to discharge vapor from said chamber; conduit means to pass the discharged vapor to the intake manifold of said internal combustion engine; a perforated magnesium plate horizontally mounted in said casing below said vaporizing unit to receive oil from said vaporizing unit whereby the oil flows thereover as a thin film and acid in the oil is removed by chemical reaction with the magnesium plate; an axially disposed oil discharge conduit extending upwardly into said chamber through said bottom to define an annular closed bottom catch basin below said perforated plate and between the said conduit and the adjacent chamber wall; and a permanent magnet detachably mounted in said annular catch basin to remove iron particles from the oil.

5. A smog retarder apparatus in accordance with claim 4 wherein the vent means includes a section containing magnesium through which the gases pass.

6. A smog retarder apparatus in accordance with claim 4 and further including a covered inspection port in the cap.

7. A smog retarder apparatus in accordance with claim 4 and further including temperature indicating means to facilitate adjustment of the means for changing the rate of flow of oil over the vaporizing unit.

8. A smog retarder apparatus in accordance with claim 4 wherein a cooling basin is provided at the base thereof.

9. A smog retarder apparatus in accordance with claim 4 wherein the electric heating means has a resistance of between one and 2.5 ohms.

References Cited

UNITED STATES PATENTS

| | | |
|---|---|---|
| 1,484,607 | 2/1924 | Hunt. |
| 1,591,690 | 7/1926 | Watson _____ 208—179 XR |
| 1,602,935 | 10/1926 | Rasey. |
| 1,747,554 | 2/1930 | Mason. |
| 1,752,050 | 3/1930 | Young. |
| 2,472,717 | 6/1949 | Morey _____ 208—179 XR |
| 2,785,109 | 3/1957 | Schwalge. |
| 2,909,284 | 10/1959 | Watkins. |
| 3,356,182 | 12/1967 | Robinson et al. __ 208—179 XR |
| 3,392,803 | 7/1968 | Robinson et al. ___ 208—179 XR |

FOREIGN PATENTS 888,453  1/1962  Great Britain.

WENDELL E. BURNS, Primary Examiner

U.S. Cl. X.R.

123—119; 184—6; 208—179, 181, 184, 186